United States Patent
Svizhenko et al.

(10) Patent No.: US 10,331,832 B2
(45) Date of Patent: Jun. 25, 2019

(54) FLOATING NODE REDUCTION USING RANDOM WALK METHOD

(71) Applicant: Synopsys, Inc., Mountain View, CA (US)

(72) Inventors: Alexei Svizhenko, San Jose, CA (US); Arindam Chatterjee, Saratoga, CA (US); Arthur B. Nieuwoudt, San Carlos, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/946,197

(22) Filed: Nov. 19, 2015

(65) Prior Publication Data
US 2017/0147729 A1 May 25, 2017

(51) Int. Cl.
*G06F 17/50* (2006.01)

(52) U.S. Cl.
CPC ........ *G06F 17/505* (2013.01); *G06F 17/5068* (2013.01); *G06F 2217/16* (2013.01); *G06F 2217/82* (2013.01)

(58) Field of Classification Search
CPC ............. G06F 17/5068; G06F 17/5045; G06F 2217/82; G06F 2217/16
USPC ........................................................ 716/132
See application file for complete search history.

(56) References Cited

U.S. PATENT DOCUMENTS

| | | | | |
|---|---|---|---|---|
| 2007/0220459 A1* | 9/2007 | Gurney | ............... | G06F 17/5036 716/112 |
| 2009/0265150 A1* | 10/2009 | Ye | ....................... | G06F 17/5036 703/2 |
| 2010/0122223 A1* | 5/2010 | Elfadel | ............... | G06F 17/5036 716/136 |

OTHER PUBLICATIONS

Batterywala, Shabbir et al., "A Staticical Method for Fast and Accurate Capacitance Extraction in the Presence of Floating Dummy Fills", 2006, IEEE, Proceedings of the 19th International Conference on VLSI Design, pp. 1-6.*

* cited by examiner

*Primary Examiner* — Stacy Whitmore
(74) *Attorney, Agent, or Firm* — Bever, Hoffman & Harms, LLP

(57) ABSTRACT

A method for floating node reduction uses a capacitance matrix that specifies coupling capacitances between signal nodes and floating nodes of an interconnect structure. Random walks are performed from a first signal node to the other signal nodes, wherein each of the random walks traverses one or more of the floating nodes. Each of the random walks is directed based on probabilities derived from the coupling capacitances of the capacitance matrix. A count is maintained for each of the other signal nodes, wherein each count specifies a number of the random walks that end on the corresponding signal node. The indirect coupling capacitance from the first signal node to a second signal node is selected to correspond with the total indirect coupling capacitance of the first signal node, times the count associated with the second signal node, divided by the total number of random walks.

32 Claims, 8 Drawing Sheets

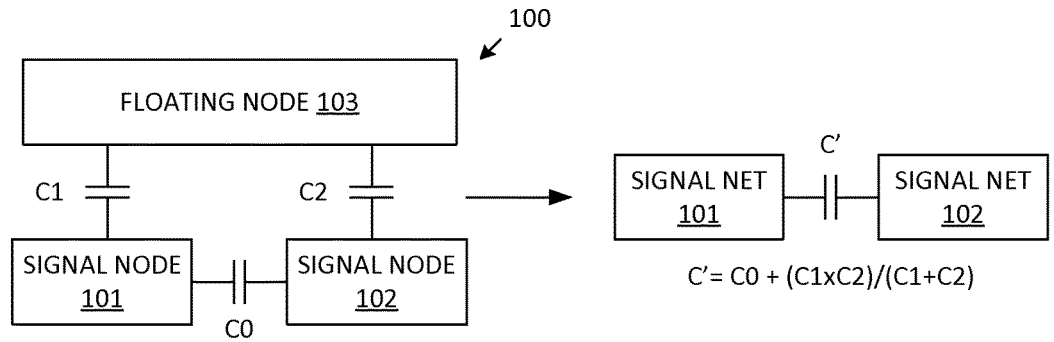
FIG. 1
(PRIOR ART)
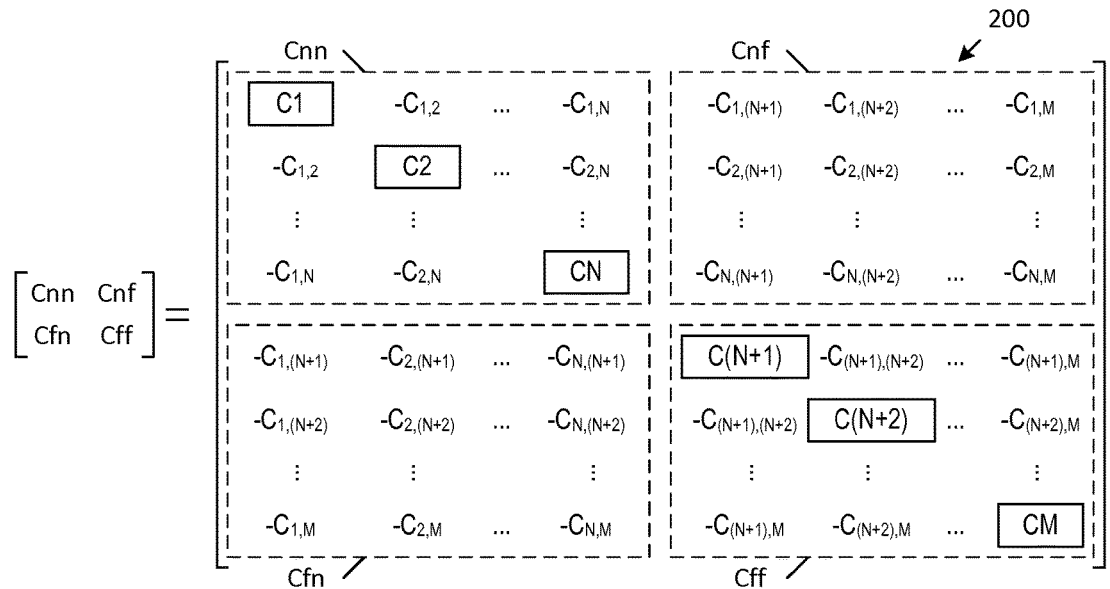
FIG. 2
(PRIOR ART)
FIG. 3
(PRIOR ART)

$$\begin{bmatrix} Cn & Cnf \\ Cfn & Cff \end{bmatrix} =$$

$$400 \rightarrow \begin{bmatrix} \begin{array}{cccc|cccc} C1' & 0 & \cdots & 0 & -C_{1,(N+1)} & -C_{1,(N+2)} & \cdots & -C_{1,M} \\ 0 & C2' & \cdots & 0 & -C_{2,(N+1)} & -C_{2,(N+2)} & \cdots & -C_{2,M} \\ \vdots & \vdots & \cdots & \vdots & \vdots & \vdots & \cdots & \vdots \\ 0 & 0 & \cdots & CN' & -C_{N,(N+1)} & -C_{N,(N+2)} & \cdots & -C_{N,M} \\ \hline -C_{1,(N+1)} & -C_{2,(N+1)} & \cdots & -C_{N,(N+1)} & C(N+1) & -C_{(N+1),(N+2)} & \cdots & -C_{(N+1),M} \\ -C_{1,(N+2)} & -C_{2,(N+2)} & \cdots & -C_{N,(N+2)} & -C_{(N+1),(N+2)} & C(N+2) & \cdots & -C_{(N+2),M} \\ \vdots & \vdots & \cdots & \vdots & \vdots & \vdots & \cdots & \vdots \\ -C_{1,M} & -C_{2,M} & \cdots & -C_{N,M} & -C_{(N+1),M} & -C_{(N+2),M} & \cdots & CM \end{array} \end{bmatrix}$$

Cn, Cnf, Cfn, Cff (quadrant labels)

FIG. 4

FLOATING NODE REDUCTION USING RANDOM WALK METHOD

FIELD OF THE INVENTION

The present invention relates to floating node reduction in an integrated circuit design. More specifically, the present invention relates to the use of a random walk method to implement floating node reduction in an integrated circuit design.

RELATED ART

The multi-layer interconnect structures of advanced integrated circuit (IC) designs typically includes signal nets (or signal nodes), which are used to transmit signals/voltages to/from electronic circuitry of the IC, and floating metal fills (or floating nodes), which are not electrically connected to the signal nodes, and which do not carry signals/voltages to/from the electronic circuitry of the IC design. Floating metal fills provide mechanical and structural stability. In general, floating metal fills reduce process variation, which may occur if non-uniform metal density exists in the interconnect structure.

Floating metal fills introduce indirect (parasitic) capacitive coupling between signal nodes. In order to accurately model the transmission of signals on the signal nodes (e.g., when static timing analysis is performed on the IC design), the parasitic capacitances introduced by the floating metal fills must be included in the modeled capacitances of the signal nodes. The process of including the parasitic capacitance introduced by the floating metal fills in the modeled capacitance of the signal nodes is referred to as floating node reduction (because the parasitic capacitances associated with the floating metal fills are effectively 'reduced' to capacitances of the signal nodes).

FIG. 1 is a block diagram illustrating floating node reduction of an interconnect structure 100 including a first signal node 101, a second signal node 102 and a floating node 103. Capacitance C0 represents the direct capacitance between signal nodes 101 and 102. Capacitance C1 represents the parasitic capacitance between the first signal node 101 and the floating node 103, and capacitance C2 represents the parasitic capacitance between the second signal node 102 and the floating node 103. In a floating node reduction, the floating node 103 is eliminated, and the capacitances C0, C1 and C2 are reduced to an effective capacitance C' coupling the first and second signals nodes 101 and 102, wherein the effective capacitance C' is equal to C0+(C1*C2)/(C1+C2).

As interconnect structures become larger and more dense, it becomes more difficult to perform floating node reduction. During a conventional capacitance extraction process, the capacitances between signal nodes and floating nodes of an interconnect structure are determined. FIG. 2 is a capacitance matrix 200 that represents the capacitances associated with an interconnect structure of an IC design. Capacitance matrix 200 includes four blocks Cnn, Cnf, Cfn and Cff, with block Cnn corresponding with signal node-to-signal node capacitances, block Cnf corresponding with signal node-to-floating node capacitances, block Cfn corresponding with floating node-to-signal node capacitances, and block Cff corresponding with floating node-to-floating node capacitances. The interconnect structure represented by capacitance matrix 200 includes N signal nodes, which are represented by identifiers 1, 2, . . . N, and (M−N) floating nodes, which are represented by identifiers (N+1), (N+2), . . . M.

The total capacitances of each of the N signal nodes are shown as capacitances C1, C2, . . . CN in FIG. 2. Similarly, the total capacitances of each of the (M–N) floating nodes are shown as capacitances C(N+1), C(N+2), . . . CM in FIG. 2. Each row of the capacitance matrix 200 includes the total capacitance of an associated node, as well as the capacitances between that node and each of the other signal/floating nodes of the interconnect structure. For example, the first row of the capacitance matrix 200 includes the total capacitance (C1) of signal node 1, the direct capacitances between signal node 1 and signal nodes 2 to N (i.e., capacitances $C_{1,2} \ldots C_{1,N}$, respectively) and the parasitic capacitances between signal node 1 and floating nodes (N+1), (N+2), M (i.e., capacitances $C_{1,(N+1)}$, $C_{1,(N+2)}$, . . . $C_{1,M}$, respectively). The total capacitance of the node (C1) is equal to the sum of the direct capacitances ($C_{1,2}, \ldots C_{1,N}$) and the parasitic capacitances ($C_{1,(N+1)}, C_{1,(N+2)}, \ldots C_{1,M}$). Note that in the various matrices described herein, the diagonal values are positive and the off-diagonal values are negative (or zero), in accordance with standard labeling conventions. The total capacitance of the node associated with row 'i' of the capacitance matrix 200 can therefore be represented as follows.

$$Ci = \Sigma C_{i,j} \qquad \text{equation (1)}$$

wherein $C_{i,j} = C_{j,i}$, and wherein 'j' represents the integers from 1 to M, excluding 'i'.

FIG. 3 is an equation that includes a charge matrix 301, the capacitance matrix 200 and a voltage matrix 302. The charge matrix 301 includes a charge vector Qn representing the charges on the signal nodes, and a charge vector Qf representing the charges on the floating nodes. The voltage matrix 301 includes a voltage vector Vn representing the voltages on the signal nodes, and a voltage vector Vf representing the voltages on the floating nodes. Because the charges on the floating nodes are necessarily equal to zero, the matrices of FIG. 3 can be reduced as set forth below.

$$Qf = Cfn*Vn + Cff*Vf = 0 \qquad \text{equation (2)}$$

$$Qn = Cnn*Vn + Cnf*Vf \qquad \text{equation (3)}$$

Solving equation (2) for Vf provides the following.

$$Vf = -Cfn*Vn*(Cff)^{-1} \qquad \text{equation (4)}$$

Substituting Vf from equation (4) into equation (3) provides the following.

$$Qn = Cnn*Vn + Cnf*-Cfn*Vn*(Cff)^{-1} \qquad \text{equation (5)}$$

$$Qn = (Cnn - Cnf*(Cff)^{-1}*Cfn)*Vn \qquad \text{equation (6)}$$

In equation (6), the term Cnn specifies the direct capacitances between the signal nodes, and the term $(Cnf*(Cff)^{-1}*Cfn)$ specifies the indirect parasitic capacitances introduced by the floating nodes to the signal nodes. The term $(Cnn - Cnf*(Cff)^{-1}*Cfn)$ is a Schur complement matrix, having all positive elements. In general, the Schur complement matrix $(Cnn - Cnf*(Cff)^{-1}*Cfn)$ represents the capacitances between the signal nodes, with the parasitic capacitances introduced by the floating nodes included. The Schur complement matrix therefore provides a solution for floating node reduction.

Finding the Schur complement matrix, which involves matrix inversion and matrix multiplications, is usually handled by methods of linear algebra, such as Gauss elimination or Cholesky decomposition. These methods rely heavily on sparsity of the matrix. If the Schur complement matrix is not sufficiently sparse, the performance becomes poor (i.e., the CPU run time required to determine the Schur complement matrix becomes excessively long).

The Schur complement matrix can be made sparse by ignoring capacitances that are less than a predetermined value (e.g., capacitances less than 1E-18 Farads, 1E-19 Farads or 1E-20 Farads may be assumed to be zero in various methods). However, an aggressive sparsification of the Schur complement matrix leads to severe accuracy issues due to rapid error accumulation. In advanced technology nodes of 20 nm and below, capacitance matrices become denser for the following reasons: 1) downscaling of smallest design features increases the number of small capacitive couplings; and 2) track fills, which are long floating wires, become dominant due to the ease of fabrication.

Floating metal fills are omnipresent, thereby rendering floating node reduction a necessity. Linear algebra methods for implementing floating node reduction do not provide an acceptable level of accuracy. Moreover, linear algebra methods will come to a grinding halt when trying to resolve smaller capacitances, and there are currently no other solutions for implementing floating node reduction.

It would therefore be desirable to have a method for solving the accuracy-performance gridlock of conventional floating node reduction processes.

SUMMARY

Accordingly, the present invention provides an improved method for floating node reduction, which involves performing a plurality of random walks from a first signal node of an interconnect structure to a plurality of associated signal nodes of the interconnect structure, wherein each of the random walks proceeds through one or more floating nodes of the interconnect structure. The path of each random walk is determined by probabilities, which are based on the extracted capacitances of the signal nodes and floating nodes of the interconnect structure. The numbers of random walks ending on each of the associated signal nodes are counted. (Note that some of the random walks may be 'self' walks that end on the first signal node. However, it is not necessary to count the number of self walks.) The total indirect coupling capacitance of the first signal node is divided among the associated signal nodes based on the number of random walks that ended on the associated signal nodes. For example, if one half of a total of four random walks from the first signal node end on a second signal node, then the indirect coupling capacitance from the first signal node to the second signal node is determined to be one half of the total indirect coupling capacitance of the first signal node. The accuracy of the determined indirect coupling capacitances can be controlled by controlling the number of random walks. In a particular embodiment, implementing 10,000 random walks from the first signal node will limit the maximum error to about 0.5%. Random walks can be performed from each of the signal nodes of the interconnect structure to determine the indirect coupling capacitances from each of the signal nodes to each of the associated signal nodes. In this manner, the floating nodes are effectively eliminated, thereby implementing floating node reduction.

In accordance with another embodiment, indirect coupling capacitances can be determined for one or more 'other' process corners. In this embodiment, the plurality of random walks are performed as described above, using a nominal process corner. The weight of each random walk is assigned a value of '1' for the nominal process corner. For each 'other' process corner, the weight of each random walk is determined based on the differences between capacitances at the nominal corner and capacitances at the 'other' process corner. More specifically, the weight of each hop of a random walk is equal to the probability of the hop at the 'other' process corner divided by the probability of the hop at the nominal process corner (wherein the probability of the hop at the 'other' process corner is determined based on capacitances of the 'other' process corner, and the probability of the hop at the nominal process corner is determined based on capacitances of the nominal process corner). The weight of each random walk at the 'other' process corner is equal to the product of the weights of each of the hops performed during the random walk. The weights of the random walks ending on each of the associated signal nodes are summed and stored for the 'other' process corner. The total indirect coupling capacitance of the first signal node at the 'other' process corner is divided among the associated signal nodes based on the weights of the random walks that ended on the associated signal nodes. For example, if the sum of the weights of the random walks that start from the first signal node and end on a second signal node is equal to W for the 'other' process corner, and the total number of random walks from the first signal node is equal to X, then the indirect coupling capacitance from the first signal node to the second signal node at the 'other' process corner is determined to be W/X of the total indirect coupling capacitance of the first signal node at the 'other' process corner. Advantageously, indirect coupling capacitances for one or more 'other' process corners can be determined using the single set of random walks performed in connection with the nominal process corner.

The present invention will be more fully understood in view of the following description and drawings.

BRIEF DESCRIPTION OF THE DRAWINGS

FIG. 1 is a block diagram illustrating floating node reduction of an interconnect structure including a first signal node, a second signal node and a floating node.

FIG. 2 is a capacitance matrix that represents the capacitances associated with an interconnect structure of an IC design.

FIG. 3 is an equation that includes a charge matrix, the capacitance matrix of FIG. 2 and a voltage matrix.

FIG. 4 is a capacitance matrix in accordance with one embodiment of the present invention, wherein the capacitance matrix of FIG. 4 results from setting all of the signal node-to-signal node capacitances of the capacitance matrix of FIG. 2 to zero values.

DETAILED DESCRIPTION

In general, an extracted capacitance matrix of an interconnect structure is converted into a probability matrix. A plurality of random walks are performed from each signal node of the interconnect structure, using the probability matrix to direct the random walks to other signal nodes (via at least one floating node). The results of the plurality of random walks from each signal node are used to approximate the Schur complement matrix (and thereby implement floating node reduction). The Schur complement matrix is approximated in an accurate and timely manner, thereby overcoming the deficiencies of conventional methods. The present invention will now be described in more detail.

In the examples described herein, the extracted capacitance matrix 200 (FIG. 2) is converted into a probability matrix in the manner described below. Initially, all of the signal node-to-signal node capacitances between nodes 1 to N are ignored by setting each of these capacitances to a zero value. FIG. 4 is a schematic diagram illustrating the capacitance matrix 400 that results from setting all of the signal node-to-signal node capacitances of the Cnn block (FIG. 2) to zero. The total (indirect) capacitance of each of the signal nodes 1 to N (labeled as total indirect capacitances C1' to CN', respectively, in FIG. 4), is equal to the sum of the capacitances between the signal node and the floating nodes (N+1) to M. For example, the indirect capacitance C1' of signal node 1 is equal to the sum of the capacitances between signal node 1 and floating nodes (N+1), (N+2), ... M (i.e., the sum of capacitances $C_{1,(N+1)}$, $C_{1,(N+2)}$, ... $C_{1,M}$). The modified Cnn block of FIG. 2 is re-labeled as the Cn block in FIG. 4. Note that the Cnf, Cfn, and Cff blocks of capacitance matrix 400 remain unchanged from capacitance matrix 200.

Figure 5A:
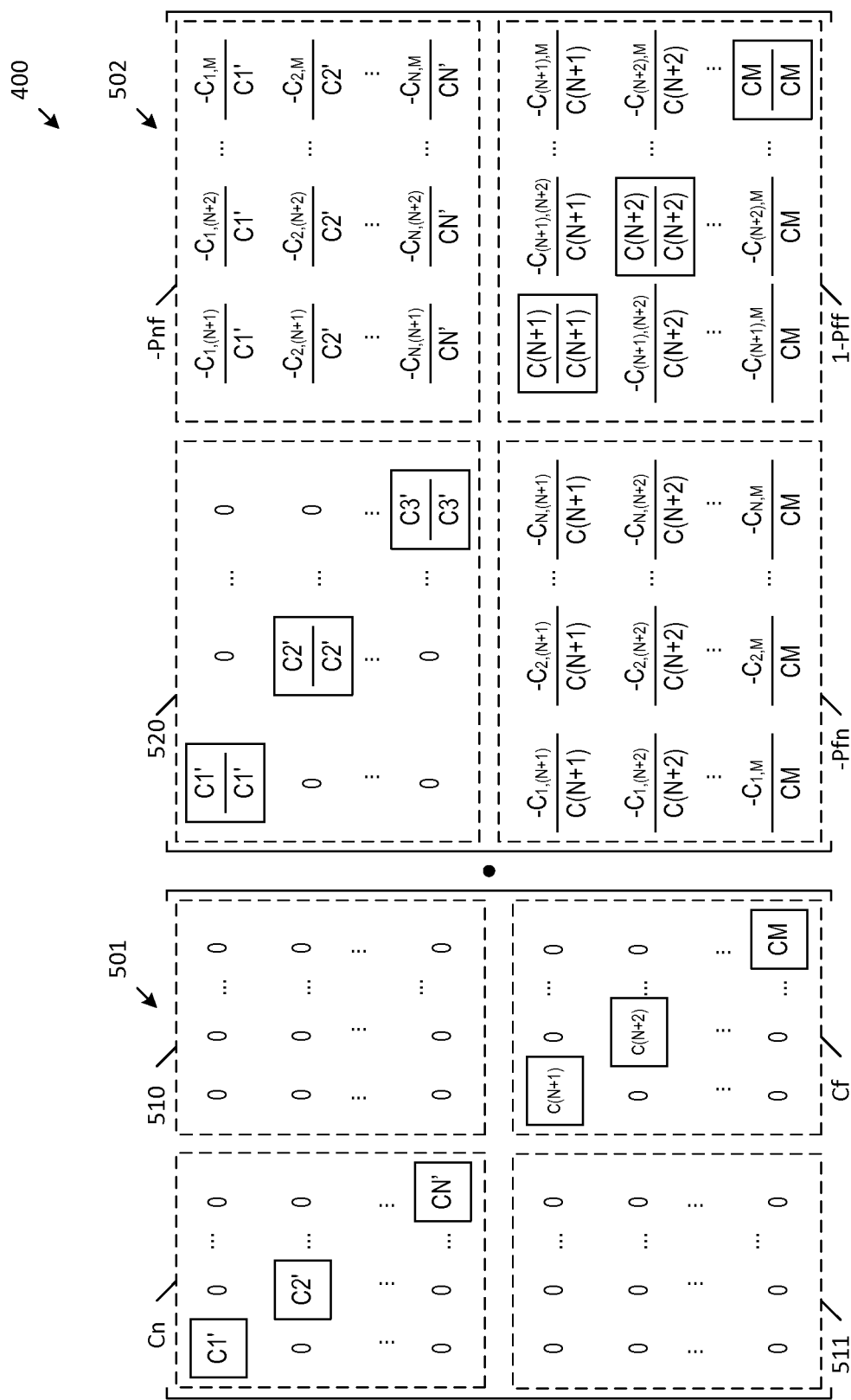
FIG. 5A is a schematic diagram that represents a normalization of the capacitance matrix of FIG. 4 by creating a weight matrix and a probability matrix.

FIG. 5A is a schematic diagram that represents a normalization of the capacitance matrix 400 of FIG. 4. As illustrated by FIG. 5A, the rows of capacitive matrix 400 are normalized by the 'diagonal' capacitance values, such that the capacitance matrix 400 is represented by the product of a weight matrix 501 and a probability matrix 502.

The weight matrix 501 includes the diagonal capacitance values (i.e., the total indirect capacitances C1' to CN' of the signal nodes 1 to N and the total capacitances C(N+1) to CM of the floating nodes (N+1) to M), as illustrated. More specifically, weight matrix 501 includes the Cn block (described above), a Cf block, which includes a diagonal with the floating node capacitances C(N+1), C(N+2), CM, and two 'zero' blocks 510 and 511.

The probability matrix 502 is created by dividing the capacitances in each row by the corresponding 'diagonal' capacitance of the matrix 400. For example, each of the capacitances in the first row of matrix 400 is divided by the diagonal capacitance C1' of the first row (i.e., the total indirect capacitance of signal node 1), each of the capacitances of the second row of matrix 400 is divided by the diagonal capacitance C2' of the second row (i.e., the total indirect capacitance of signal node 2), and each of the capacitances of row (N+1) of matrix 400 is divided by the diagonal capacitance C(N+1) of row (N+1) (i.e., the total capacitance of floating node (N+1)). The probability matrix 502 includes a '1' block 520, which includes '1' values along the diagonal (and '0' values elsewhere). The probability matrix 502 also includes probability blocks –Pnf, –Pfn and (1–Pff), as illustrated. Note that probability blocks –Pnf and –Pfn are not identical blocks.

Figures 5B, 6:
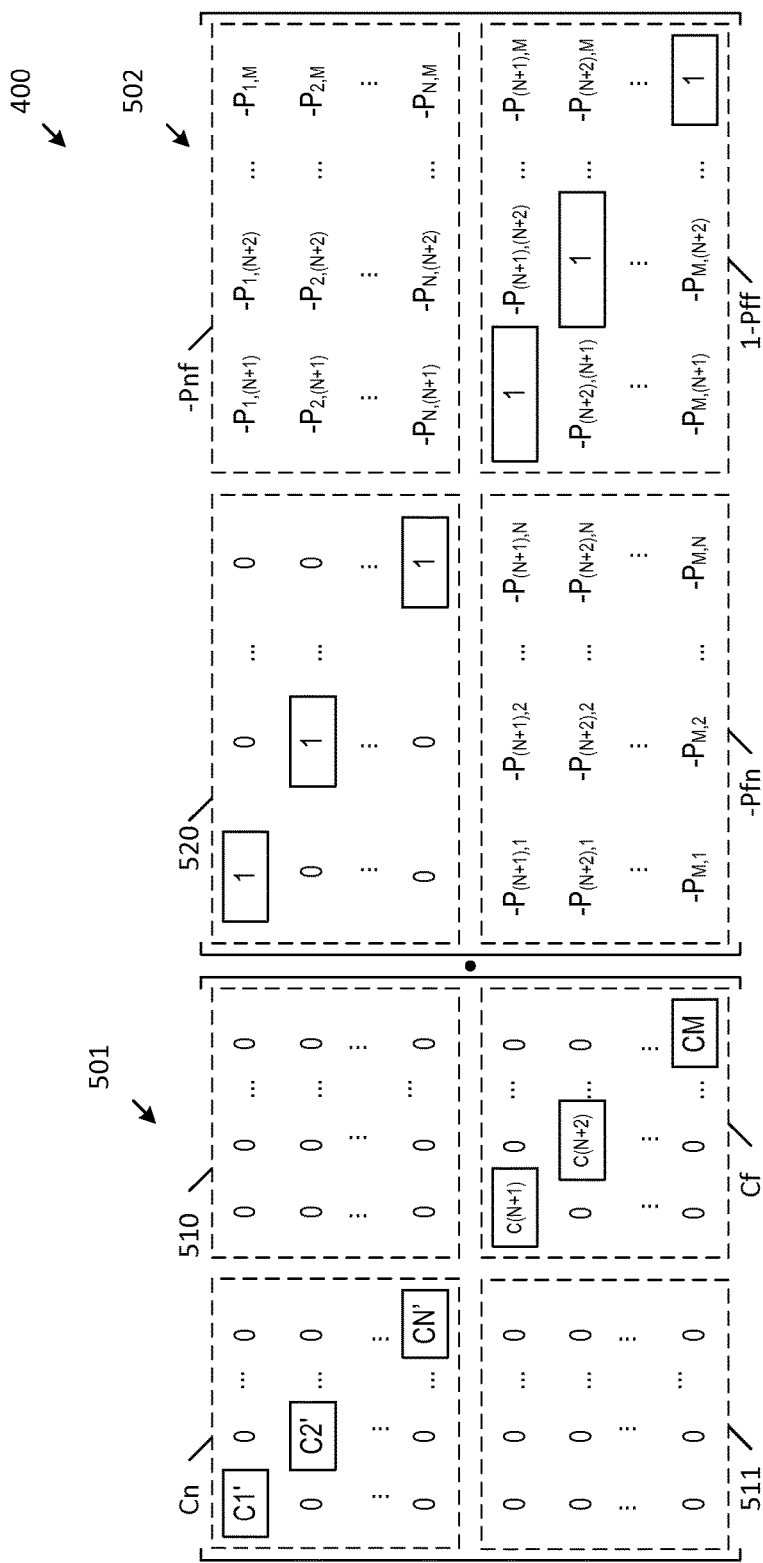
FIG. 5B is a schematic diagram that simplifies the probability matrix of FIG. 5A.
FIG. 6 is an equation that illustrates the transformation of capacitance matrix of FIG. 4 into the weight matrix and the probability matrix of FIGS. 5A-5B, and further illustrates the transformation of the weight matrix and the probability matrix into another matrix.

FIG. 5B is a schematic diagram that simplifies the probability matrix 502 of FIG. 5A by reducing the diagonal values to '1' values, relabeling the various entries of probability block–Pnf as probabilities $P_{i,j}$, wherein $P_{i,j}=C_{i,j}/Ci'$, and relabeling the various entries of probability blocks–Pfn and (1–Pff) as probabilities $P_{i,j}$, wherein $P_{i,j}=C_{i,j}/Ci$. Note that for each row 'i' of probability matrix 502, $\Sigma P_{i,j}=1$.

FIG. 6 is an equation that illustrates the transformation of capacitance matrix 400 into weight matrix 501 and probability matrix 502, and further illustrates the transformation of weight matrix 501 and probability matrix 502 into matrix 600. The Schur complement matrix of matrix 600 can be represented as follows.

$$S=(Cn+(Cn*Pnf*(Cf*(1-Pff))^{-1}*Cf*Pfn) \quad \text{equation (7)}$$

Using a Taylor expansion, equation (7) can be re-written as follows.

$$S=(Cn+(Cn*Pnf*\Sigma_{n=0}^{\infty}(Pff)^n*Pfn) \quad \text{equation (8)}$$

Equation (8) provides the basis to construct a random walk (Markov chain), wherein the Cn block is a weight matrix and the Pnf, Pff and Pfn blocks are transition matrices. A number (X) of walks are performed from each of the signal nodes 1 to N. For example, X walks can be performed from signal node i (wherein i=1 to N). The first random hop of the walk proceeds from signal node i to floating node k (wherein k=(N+1) to M), wherein the probability of hopping from signal node i to floating node k is given by $P_{i,k}$ in probability matrix 502. One or more additional random hops are performed, until reaching another signal node (i.e., a signal node other than signal node i). A record is kept of the number of walks that reach each of the other signal nodes. The number of walks that reach signal node j, when starting from signal node i, is designated $n_{i,j}$. The indirect coupling capacitance $S_{i,j}$ between signal node i and signal node j is estimated as follows.

$$S_i=Ci'*n_{i,j}/X \quad \text{equation (9)}$$

That is, the fraction of the total indirect coupling capacitance Ci' designated to the path from signal node i to signal node j is equal to the number of random walks from signal node i that end on signal node j, divided by the total number of random walks X from signal node i.

The standard deviation ($\sigma$) of the estimated indirect coupling capacitance $S_i$, can be defined as follows.

$$\sigma = \frac{Ci'}{\sqrt{x}} \times \sqrt{\frac{n_{i,j}}{x}\left(1-\frac{n_{i,j}}{x}\right)} \quad \text{equation (10)}$$

The maximum error ($\varepsilon$) of the estimated indirect coupling capacitance $S_{i,j}$ can be defined as follows.

$$\varepsilon = \frac{0.5}{\sqrt{X}} \quad \text{equation (11)}$$

Thus, assuming that 10,000 random walks are performed from signal node i (i.e., X=10,000), the maximum error of the estimated indirect coupling capacitance $S_{i,j}$ is equal to 0.5%. Note that the accuracy of the indirect coupling capacitance $S_{i,j}$ can be controlled by controlling the number of random walks X.

Figure 7:
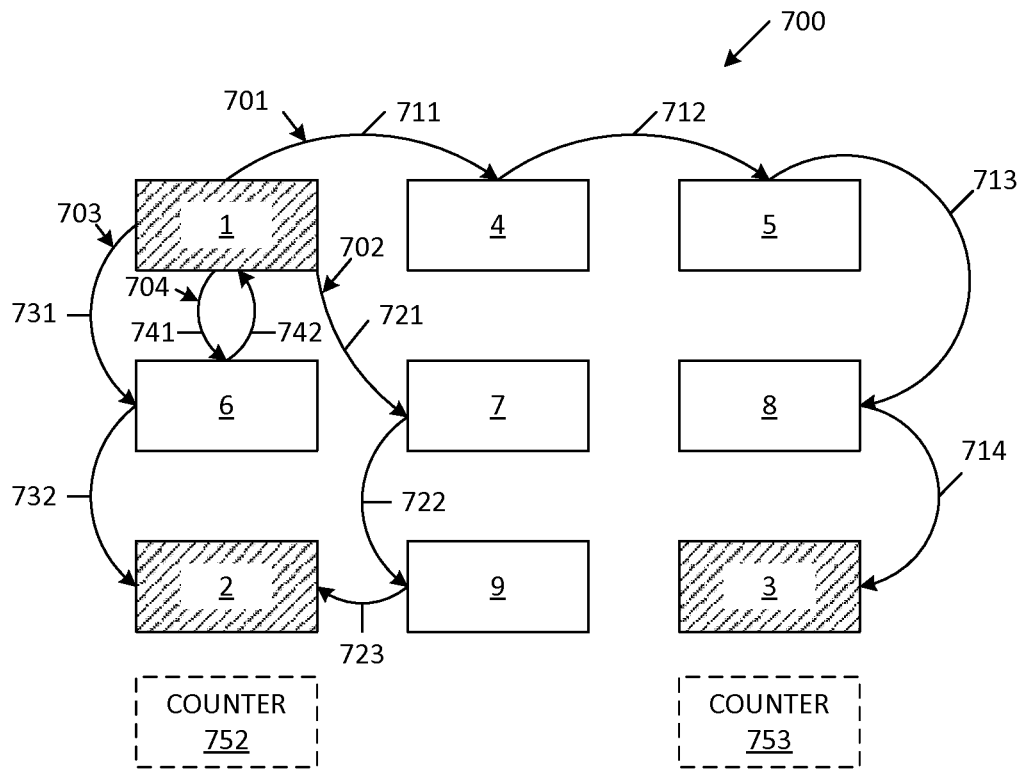
FIG. 7 is a block diagram of an exemplary interconnect structure, which includes signal nodes and floating nodes.
Figure 8:
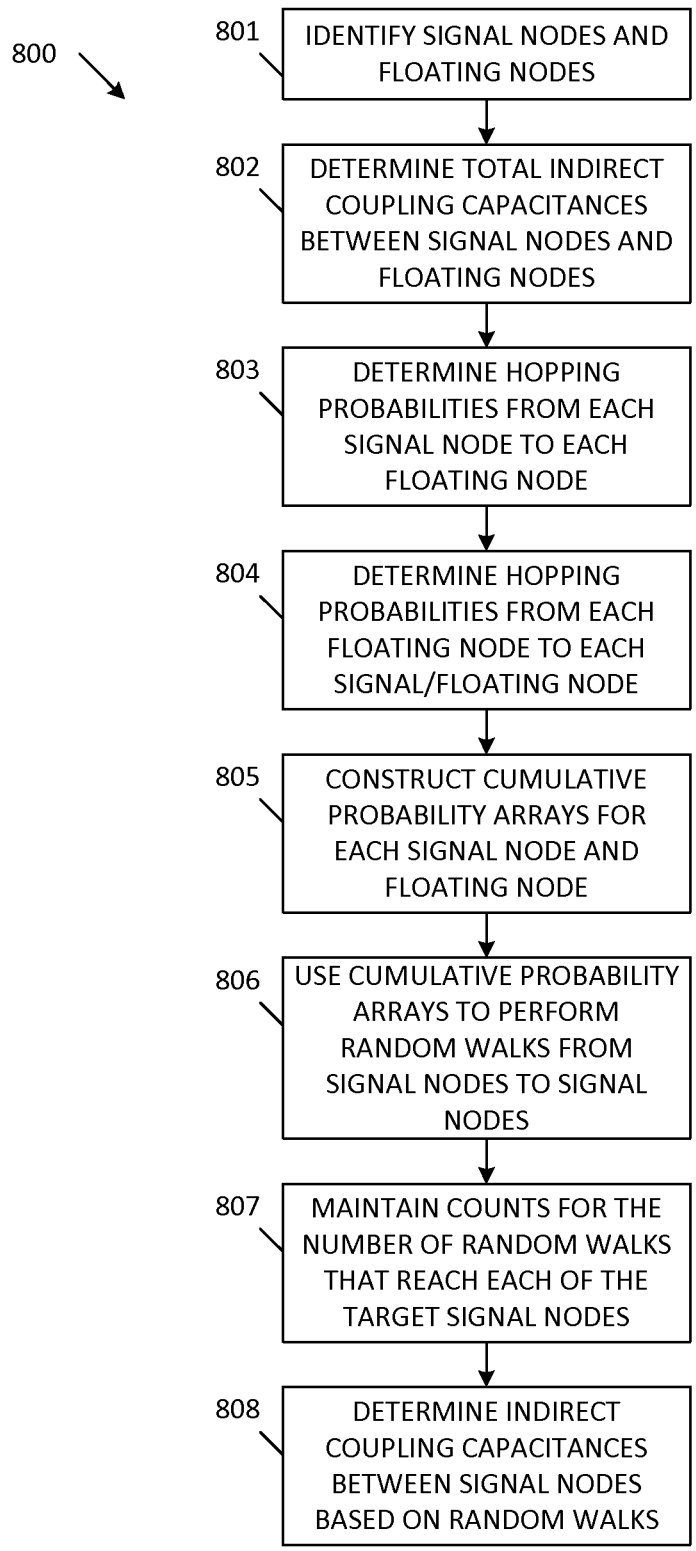
FIG. 8 is a flow diagram illustrating a method for implementing the random walks in accordance with one embodiment.

The manner in which each random walk is performed will now be described in more detail in accordance with a specific example. FIG. 7 is a block diagram of an interconnect structure 700, which includes signal nodes 1-3, and floating nodes 4-9. Thus, in accordance with the examples of FIGS. 4, 5A and 5B, N=3 and M=9. FIG. 8 is a flow diagram 800 illustrating a method for implementing the random walks in accordance with one embodiment.

As described above (FIGS. 4, 5A and 5B), hopping probabilities for the random walks must be determined. Signal nodes that are capacitively coupled to floating nodes are identified (Step 801). It is the capacitance of these signal nodes that will be affected by floating node reduction. All other signal nodes and their coupling capacitances are ignored in further discussion, as they are not affected by the method. Thus, in the example of FIG. 7, signal nodes 1-3 and the associated floating nodes 4-9 are initially identified.

The indirect coupling capacitance between each of signal node and the associated floating nodes are then summed to produce the total indirect capacitances of the signal nodes (Step 802). For example, the indirect coupling capacitance C1' of signal node 1 determined by summing the capacitances between signal node 1 and floating nodes 4-9 (i.e., $C_{1,4}+C_{1,5}+C_{1,6}+C_{1,7}+C_{1,8}+C_{1,9}$). Although the present example describes the manner in which random walks are performed from signal node 1, it is understood that random walks are also performed from signal nodes 2 and 3 in a similar manner.

The coupling capacitances between the signal nodes and the associated floating nodes are then divided by the total indirect capacitances of the signal nodes to produce sets of probabilities to hop from the signal nodes to the surrounding floating nodes (Step 803). For example, the coupling capacitances between signal node 1 and the associated floating nodes 4-9 (i.e., $C_{1,4}$, $C_{1,5}$, $C_{1,6}$, $C_{1,7}$, $C_{1,8}$ and $C_{1,9}$) are each divided by the total indirect capacitance of signal node 1 (i.e., C1'), thereby providing the set of probabilities $C_{1,4}/C1'$, $C_{1,5}/C1'$, $C_{1,6}/C1'$, $C_{1,7}/C1'$, $C_{1,8}/C1'$ and $C_{1,9}/C1'$ for hopping to floating nodes 4, 5, 6, 7, 8 and 9, respectively. Note that these probabilities are represented in the first rows of the probability matrix 502 in FIGS. 5A and 5B. Note that the probabilities $C_{1,4}/C1'$, $C_{1,5}/C1'$, $C_{1,6}/C1'$, $C_{1,7}/C1'$, $C_{1,8}/C1'$ and $C_{1,9}/C1'$ may be designated as probabilities $P_{1,4}$, $P_{1,5}$, $P_{1,6}$, $P_{1,7}$, $P_{1,8}$ and $P_{1,9}$, respectively, in accordance with the teachings of FIGS. 5A and 5B.

The coupling capacitances between each of the floating nodes and the associated signal and floating nodes are divided by the total capacitances of the floating nodes to produce sets of probabilities to hop from the floating nodes to the surrounding floating/signal nodes (Step 804). For example, the coupling capacitances between the floating node 4 and associated signal nodes 1-3 (i.e., $C_{1,4}$, $C_{2,4}$ and $C_{3,4}$) and associated floating nodes 5-9 (i.e., $C_{4,5}$, $C_{4,6}$, $C_{4,7}$, $C_{4,8}$ and $C_{4,9}$) are each divided by the total capacitance of floating node 4 (i.e., C4), thereby providing the set of probabilities $C_{1,4}/C4$, $C_{2,5}/C4$, $C_{3,4}/C4$, $C_{4,5}/C4$, $C_{4,6}/C4$, $C_{4,7}/C4$, $C_{4,8}/C4$ and $C_{4,9}/C4$ for hopping from floating node 4 to signal nodes 1, 2, 3 and floating nodes 5, 6, 7, 8 and 9, respectively. Note that the probabilities $C_{1,4}/C4$, $C_{2,5}/C4$, $C_{3,4}/C4$, $C_{4,5}/C4$, $C_{4,6}/C4$, $C_{4,7}/C4$, $C_{4,8}/C4$ and $C_{4,9}/C4$ may be designated as probabilities $P_{4,1}$, $P_{4,2}$, $P_{4,3}$, $P_{4,5}$, $P_{4,6}$, $P_{4,7}$, $P_{4,8}$ and $P_{4,9}$, respectively, in accordance with the teachings of FIGS. 5A and 5B.

A cumulative probability array is constructed for each of the signal nodes and each of the floating nodes (Step 805). The elements of each cumulative probability array include a cumulative sum of the probabilities of the associated node. Each entry of the cumulative probability array has an associated node that may become the destination of a hop. For example, assume that the probabilities $P_{1,4}$, $P_{1,5}$, $P_{1,6}$, $P_{1,7}$, $P_{1,8}$ and $P_{1,9}$ associated with signal node 1 have nominal values of 0.40, 0.06, 0.40, 0.10, 0.02 and 0.02, respectively. The cumulative probability array for signal node 1 could therefore be represented as set forth below in Table 1.

TABLE 1

| Cumulative probability value for signal node 1 | Associated floating node |
|---|---|
| 0.00 to 0.40 | 4 |
| >0.40 to 0.46 | 5 |
| >0.46 to 0.86 | 6 |
| >0.86 to 0.96 | 7 |
| >0.96 to 0.98 | 8 |
| >0.98 to 1.00 | 9 |

Figure 9:
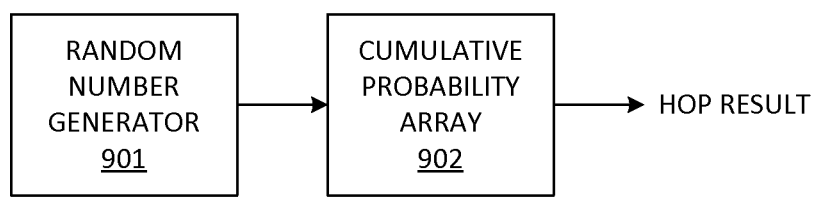
FIG. 9 is a block diagram of a random number generator and a cumulative probability array, which are used to implement a hop of a random walk in accordance with one embodiment.

FIG. 9 is a block diagram of a random number generator 901 and a cumulative probability array 902, which are used to implement a hop of a random walk in accordance with one embodiment. At the start of a random walk, random number generator 901 generates a random number between 0.00 and 1.00, inclusive. This random number is applied to the cumulative probability array 902, and is used to select a destination (floating node) of a first hop of the random walk. For example, a random number of 0.25 falls in the probability range of 0.00 to 0.40, thereby resulting in the first hop of the random walk proceeding from the signal node 1 to the floating node 4. Note that floating nodes having a high capacitive coupling to the signal node 1 (e.g., floating nodes 4 and 6) have a high probability of being reached on the first hop, and floating nodes having a low capacitive coupling to the signal node (e.g., floating nodes 8 and 9) have a low probability of being reached on the first hop. Further note that, by construction, the first hop of a random walk always lands on a floating node.

As described above, each of the floating nodes 4-9 has a corresponding cumulative probability array. In the described example, the random number generator 901 generates another random number, which is applied to the cumulative probability array of the floating node 4. This random number is used to select the node reached by the second hop of the random walk. Additional hops are performed in this manner, until a hop lands on another signal node (e.g., signal node 2 or 3). For example, a first random walk 701 may include a first hop 711 from signal node 1 to floating node 4 (with probability $P_{1,4}=C_{1,4}/C1'$), a second hop 712 from floating node 4 to floating node 5 (with probability $P_{4,5}=C_{4,5}/C4$), a third hop 713 from floating node 5 to floating node 8 (with probability $P_{5,8}=C_{5,8}/C5$), and a fourth hop 714 from floating node 8 to signal node 3 (with probability $P_{8,3}=C_{8,3}/C8$).

A predetermined number (X) of random walks are performed from the signal node 1 to the associated signal nodes 2 and 3. (Step 806). As illustrated in FIG. 7, a second random walk 702 may include a first hop 721 from signal node 1 to floating node 7 (with probability $P_{1,7}=C_{1,7}/C1'$), a second hop 722 from floating node 7 to floating node 9 (with probability $P_{7,9}=C_{7,9}/C7$), and a third hop 723 from floating node 9 to signal node 2 (with probability $P_{9,2}=C_{9,2}/C9$).

As also illustrated in FIG. 7, a third random walk 703 may include a first hop 731 from signal node 1 to floating node 6 (with probability $P_{1,6}=C_{1,6}/C1'$), a second hop 732 from floating node 6 to signal node 2 (with probability $P_{6,2}=C_{6,2}/C6$).

As also illustrated by FIG. 7, a fourth random walk 704 may include a first hop 7410 from signal node 1 to floating node 6 (with probability $P_{1,6}=C_{1,6}/C1'$), a second hop 742 from floating node 6 to signal node 1 (with probability $P_{6,1}=C_{6,1}/C6$). Random walks that start and end on the same signal node (i.e., self walks) are included in the number X of random walks X.

In one embodiment, each of the target signal nodes that can be reached during a random walk has an associated counter, which is incremented each time that a random walk reaches the target signal node (Step 807). Thus, in the described example, the target signal nodes 2 and 3 have associated counters 752 and 753, respectively. Counter 752 counts the number of random walks from signal node 1 that end on signal node 2. Similarly, counter 753 counts the number of random walks from signal node 1 that end on signal node 3. In the example of FIG. 7, counter 752 counts the two random walks 702 and 703 that end on signal node 2, and counter 753 counts the one random walk 701 that ends on signal node 3.

After the predetermined number X of random walks are performed from the signal node 1, the indirect capacitances between the signal node 1 and the other associated signal nodes 2 and 3 are determined using equation (9) (Step 808). Thus, in the example illustrated by FIG. 7, four random walks 701-703 are performed (X=4), wherein one of these random walks 701 lands on signal node 3, and two of these random walks 702-703 land on signal node 2 (and one of these random walks 704 is a self walk that lands on signal node 1). Thus, in accordance with equation (9), the indirect coupling capacitance from signal node 1 to signal node 2 is specified as follows.

$$S_{1,2}=C1'*n_{1,2}/X=C1'*2/4 \qquad \text{equation (12)}$$

Similarly, the indirect coupling capacitance from signal node 1 to signal node 3 is specified as follows.

$$S_{1,3}=C1'*n_{1,3}/X=C1'*1/4 \qquad \text{equation (13)}$$

As described above in connection with equations (10) and (11), the accuracy of the estimation of the indirect coupling capacitances is controlled by the number (X) of random walks performed. Although only four random walks are described in the present example, it is understood that many more random walks will typically be implemented in actual practice.

After all of the X random walks associated with signal node 1 are completed and the associated indirect coupling capacitances are determined, the above-described process is repeated for the other signal nodes of the interconnect structure (e.g., signal nodes 2 and 3). Although only three signal nodes and six floating nodes are illustrated in the example of FIG. 7, it is understood that other numbers of signal nodes and/or floating nodes are present in other embodiments. For example, depending upon partitioning, an interconnect structure for floating node reduction may include from 100 to $10^4$ signal nodes and from $10^4$ to $10^6$ floating nodes.

In the examples described above, the various coupling capacitances each have a nominal value associated with a nominal process corner. However, technology process variations typically lead to small variations of coupling capacitances, usually referred to as process corners. In one embodiment, the above-described process can be repeated for each of the process corners, such that independent sets of random walks are performed to determine the indirect coupling capacitances for each of the process corners. However, in an alternate embodiment, the above-described method for determining indirect coupling capacitance is modified to account for multiple process corners, using only the random walks associated with the nominal process corner. In this embodiment, the different coupling capacitances associated with the different process corners are used to vary the weight of each hop of each of the random walks.

Figure 10:
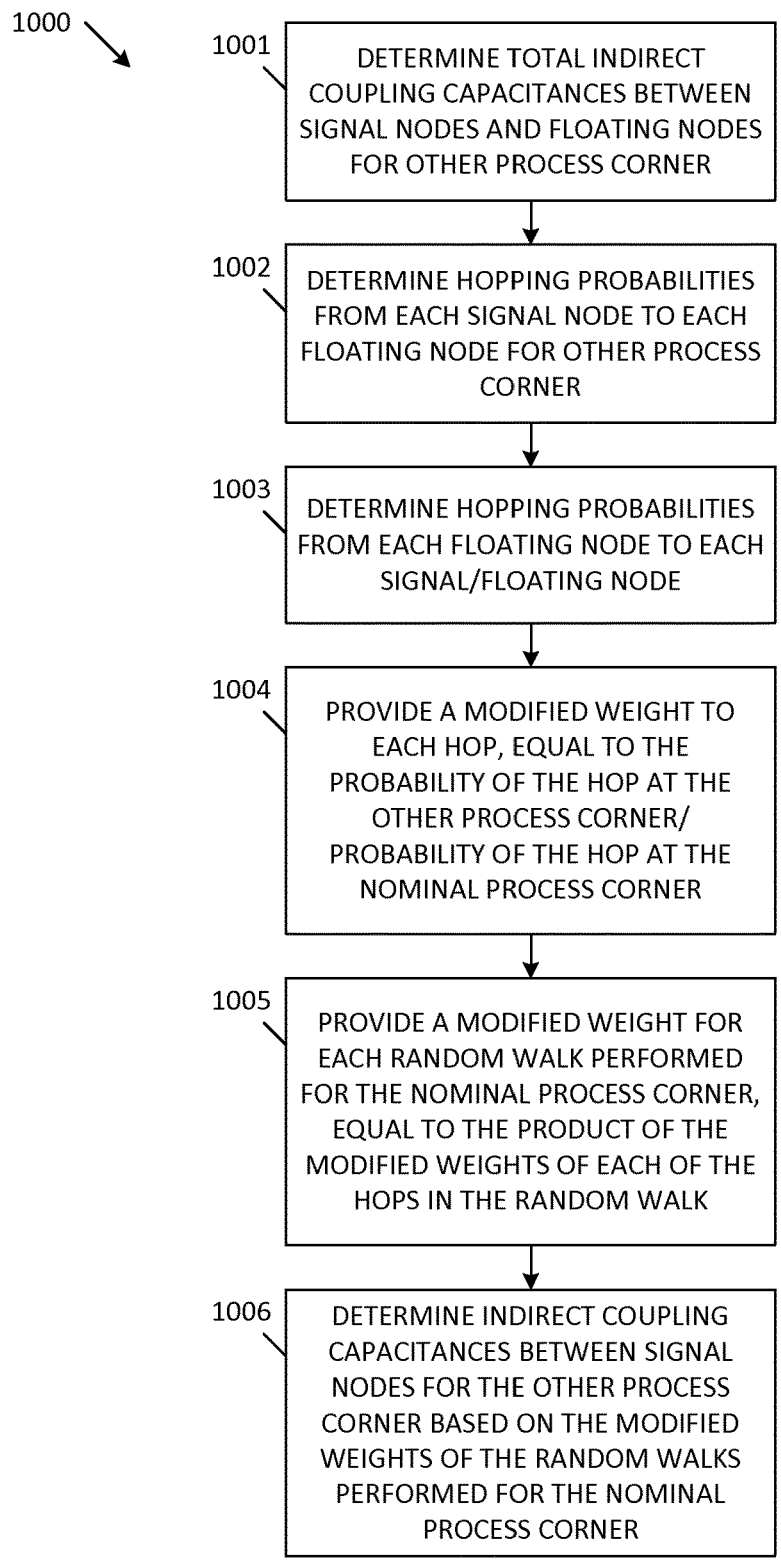
FIG. 10 is a flow diagram illustrating a method that allows the indirect coupling capacitances for a plurality of process corners to be determined simultaneously in accordance with one embodiment.

FIG. 10 is a flow diagram 1000 illustrating process steps 1001-1006 that allow the indirect coupling capacitances for one or more process corners to be determined simultaneously with the determination of the indirect coupling capacitances for a nominal process corner.

Using the extracted capacitances for one or more other process corners, the total indirect coupling capacitances between the signal nodes and the floating nodes are determined (Step 1001). This step is similar to Step 802, which is described above in connection with FIG. 8. The hopping probabilities from each of the signal nodes to each of the floating nodes is determined for each of the other process corners (Step 1002). This step is similar to step 803, which is described above in connection with FIG. 8. For example, assume that for a first process corner (pc), the coupling capacitances between the first signal node 1 and the associated floating nodes 4-9 are equal to $C(pc)_{1,4}$, $C(pc)_{1,5}$, $C(pc)_{1,6}$, $C(pc)_{1,7}$, $C(pc)_{1,8}$ and $C(pc)_{1,9}$, and the sum of these coupling capacitances is equal to $C(pc)1'$. In this case, the probabilities for hopping from the first signal node 1 to floating nodes 4-9 at the first process corner would be: $C(pc)_{1,4}/C(pc)1'$, $C(pc)_{1,5}/C(pc)1'$, $C(pc)_{1,6}/C(pc)1'$, $C(pc)_{1,7}/C(pc)1'$, $C(pc)_{1,8}/C(pc)1'$ and $C(pc)_{1,9}/C(pc)1'$, respectively. These probabilities $C(pc)_{1,4}/C(pc)1'$, $C(pc)_{1,5}/C(pc)1'$, $C(pc)_{1,6}/C(pc)1'$, $C(pc)_{1,7}/C(pc)1'$, $C(pc)_{1,8}/C(pc)1'$ and $C(pc)_{1,9}/C(pc)1'$ may be designated as probabilities $P(pc)_{1,4}$, $P(pc)_1$, $P(pc)_{1,6}$, $P(pc)_{1,7}$, $P(pc)_{1,8}$ and $P(Pc)_{1,9}$, respectively.

The hopping probabilities from each of the floating nodes to each of the other signal nodes and floating nodes is also determined for each of the other process corners (Step 1003). This step is similar to step 804, which is described above in connection with FIG. 8.

When performing random walks from the signal node 1 to the various floating nodes 4-9 for the nominal process corner as described above, each of the hops has an effective weight of '1'. For the purposes of determining the indirect coupling capacitances associated with the first process corner (pc), each of the hops is given a modified weight ($\alpha_{hop}$) equal to the probability of the hop at the first process corner, divided by the probability of the hop at the nominal process corner (Step 1004). This relationship can be stated as follows for a hop from node i to node k.

$$\alpha_{i,k}=P(pc)_{i,k}/P_{1,5}=[C(pc)_{i,k}/C(pc)i']/[C_{i,k}/Ci'] \qquad \text{eq (14)}$$

In the example of FIG. 7, the third random walk 703 from signal node 1 includes a hop 731 to floating node 6 and a hop 732 to signal node 2. As described above, at the nominal process corner, the probability of hopping from signal node 1 to floating node 6 is $C_{1,6}/C1'$ (or $P_{1,6}$), which is equal to 0.40 in the described example. At the first process corner (pc), the probability of hopping from signal node 1 to floating node 6 is $C(pc)_{1,6}/C(pc)1'$ (or $P(pc)_{1,6}$). Because of the different capacitances at different process corners, the probability $C(pc)_{1,6}/C(pc)1'$ may have a value other than 0.40, such as 0.42. In this case, the weight of the hop from signal node 1 to floating node 6 (i.e., $\alpha_{1,6}$) at the first process corner is given a weight of $[C(pc)_{1,6}/C(pc)1']/[C_{1,6}/C1']$ or 0.42/0.40=1.050.

Similarly, at the nominal process corner, the probability of hopping from floating node 6 to signal node 2 is $C_{2,6}/C6$, which may be equal to 0.41. At the first process corner (pc), the probability of hopping from floating node 6 to signal node 2 is $C(pc)_{2,6}/C(pc)6$, which may be equal to 0.42. In this example, the weight of the hop from floating node 6 to signal node 2 at the first process corner (i.e., $\alpha_{6,2}$) is given a weight of $[C(pc)_{2,6}/C(pc)6]/[C_{2,6}/C6]$ or 0.42/0.41=1.024.

The modified weight of each random walk is determined by multiplying the modified weights of each of the hops of the random walk (Step 1005). This relationship can be stated as follows.

$$\alpha_{walk} = \pi \alpha_{hops} \quad \text{equation (15)}$$

Alternately, this relationship can be stated as follows for a walk from signal node i to signal node j.

$$\alpha_{i,j} = \alpha_{i,k} * \alpha_{k,l} \ldots \alpha_{l,n} * \alpha_{m,j} \quad \text{equation (16)}$$

In the example presented above, for the first process corner (pc), random walk 703 is assigned a modified weight ($\alpha_{1,2}$) of equal to the product of the weights of hops 731 and 732, or 1.050×1.024=1.075. The modified weights of random walks 701 and 702 at the first process corner can be determined in the same manner described above. Assume, for example, that random walk 701 has a modified weight ($\alpha_{1,3}$) of 1.060 at the first process corner, and random walk 702 has a modified weight ($\alpha_{1,2}$) of 1.070 at the first process corner.

The indirect coupling capacitance between signal node i and signal node j at the first process corner is estimated by multiplying the indirect coupling capacitance at the first process corner by a value equal to the sum of the weights of the modified walks, divided by the number of random walks X (Step 1006). This relationship can be stated as follows, wherein $\Sigma \alpha_{i,j}$ is the sum of the modified weights of all random walks that reach signal node j from signal node i.

$$S(pc)_{i,j} = C(pc)i'* \Sigma \alpha_{i,j}/X \quad \text{equation (17)}$$

Thus, in the example provided above, the indirect coupling capacitance from signal node 1 to signal node 2 at the first process corner can be defined as follows.

$$S(pc)_{1,2} = C(pc)1'*(1.075+1.070)/4 \quad \text{equation (18)}$$

$$S(pc)_{1,2} = C(pc)1'*0.536 \quad \text{equation (19)}$$

Similarly, the indirect coupling capacitance from signal node 1 to signal node 3 at the first process corner can be defined as follows.

$$S(pc)_{1,3} = C(pc)1'*1.060/4 \quad \text{equation (20)}$$

$$S(pc)_{1,3} = C(pc)1'*0.265 \quad \text{equation (21)}$$

In the manner described above, simultaneous multiple corner (SMC) processing is performed, thereby determining the indirect coupling capacitances between the signal nodes of an interconnect structure at different process corners, while performing random walks for only a single process corner.

The advantages of the methods described herein include superior accuracy-performance trade-off. In particular the methods provide: (1) Up to 7× speedup of the total runtime of a conventional StarRC tool, (for the same accuracies); (2) an unbiased estimate of the effect of floating node reduction; (3) the possibility to locally tune the accuracy on some nodes by adjusting the number of walks performed from these nodes; and (4) a fundamental shift from traditional methods of linear algebra, which allows for handling non-sparse capacitance matrices.

The above-described methods for controlling the processing of extracted coupling capacitance matrices can be implemented by one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language or in assembly or machine language, if desired; and in any case, the language can be a compiled or interpreted language. Suitable processors include, by way of example, both general and special purpose microprocessors, as well as other types of micro-controllers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Figure 11:
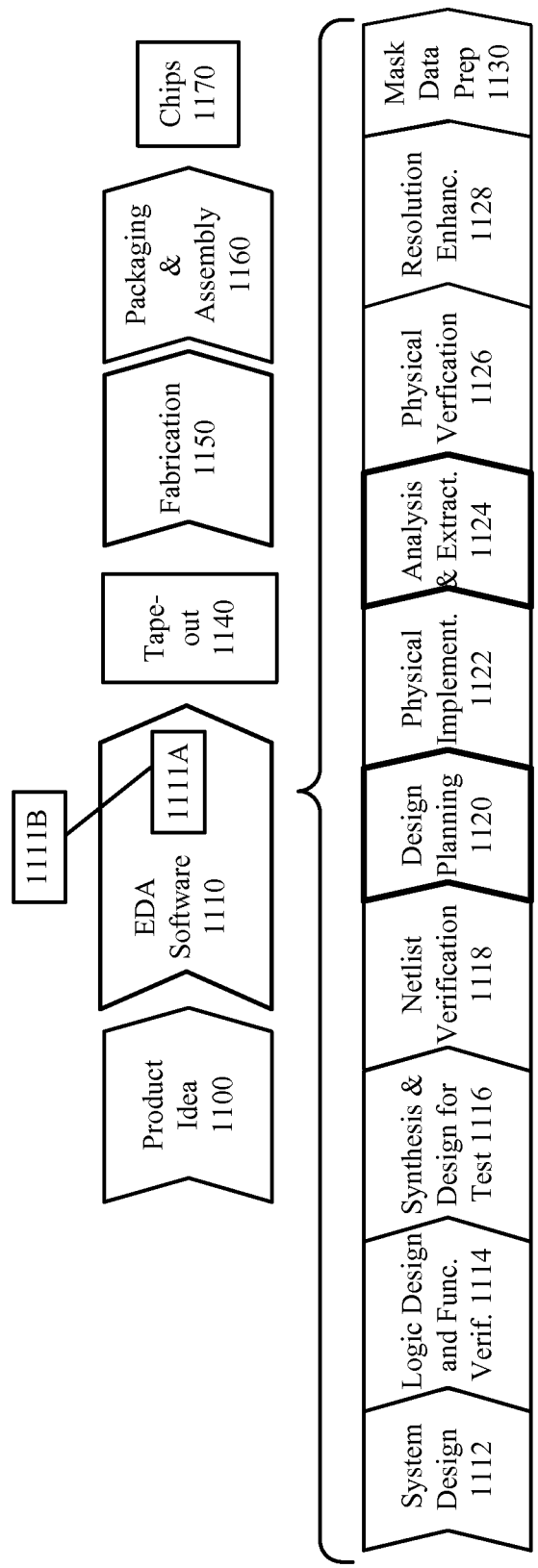
FIG. 11 is a block diagram of a simplified representation of an exemplary digital ASIC design flow, which includes processes for determining indirect coupling capacitances between signal nodes in accordance with one embodiment.

FIG. 11 is a block diagram of a simplified representation of an exemplary digital ASIC design flow including the processes for determining indirect coupling capacitances between signal nodes of an interconnect structure as described above. At a high level, the process starts with the product idea (step 1100) and is realized in an EDA software design process (step 1110). When the design is finalized, it can be taped-out (event 1140). After tape out, the fabrication process (step 1150) and packaging and assembly processes (step 1160) occur resulting, ultimately, in finished chips (result 1170). In accordance with various embodiments, the above-described methods of determining indirect coupling capacitances between signal nodes of an interconnect structure (i.e., floating node reduction), can be used in the EDA software design process (step 1110).

The EDA software design process (step 1110) is actually composed of a number of steps 1112-1130, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components/steps of the EDA software design process (step 1110) will now be provided. In one embodiment, one or more steps of the EDA software design process can be implemented using a computer-readable medium 1111A, which is read by a computer 1111B. Note that Astro, AstroRail, CustomSim, ESP, Hercules, IC Compiler, Magellan, Model Architect, Power Compiler, PrimeRail, Proteus, ProteusAF, PSMGen, Saber, StarRC, and System Studio are trademarks of Synopsys, Inc., and CATS, DesignWare, Design Compiler, Formality, HSIM, Leda, NanoSim, Primetime, Syndicated, TetraMAX, VCS, and Vera are registered trademarks of Synopsys, Inc.

System design (step 1112): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect™, Saber™, System Studio™, and DesignWare® products.

Logic design and functional verification (step 1114): At this stage, the VHDL or Verilog code for modules in the system is written and the design is checked for functional accuracy. More specifically, does the design as checked to ensure that produces the correct outputs. Exemplary EDA software products from Synopsys, Inc. that can be used at this step include HSIM®, NanoSim®, CustomSim™, VCS®, VERA®, DesignWare®, Magellan™, Formality®, ESP™ and LEDA® products.

Synthesis and design for test (step 1116): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler™, Tetramax®, and DesignWare® products.

Netlist verification (step 1118): At this step, the netlist is checked for compliance with timing constraints and for correspondence with the VHDL/Verilog source code. Exemplary EDA software products from Synopsys, Inc. that can be used at this step include Formality®, PrimeTime™, and VCS® products.

Design planning (step 1120): Here, an overall floorplan for the chip is constructed and analyzed for timing and top-level routing. Exemplary EDA software products from Synopsys, Inc. that can be used at this step include Astro™ and IC Compiler™ products. In accordance with various embodiments, the above-described methods for determining indirect coupling capacitances between signal nodes of an interconnect structure as described above (floating node reduction) can be used in design planning step 1120.

Physical implementation (step 1122): The placement (positioning of circuit elements) and routing (connection of the same) occurs at this step. Exemplary EDA software products from Synopsys, Inc. that can be used at this step include the Astro™ and IC Compiler™ products.

Analysis and extraction (step 1124): At this step, the circuit function is verified at a transistor level, this in turn permits what-if refinement. Exemplary EDA software products from Synopsys, Inc. that can be used at this step include AstroRail™, PrimeRail™, Primetime®, and Star RC/XT™ products. In accordance with various embodiments, the above-described methods of for determining indirect coupling capacitances between signal nodes of an interconnect structure as described above can be used in step 1124.

In accordance with one embodiment, a computer readable medium 1111A stores instructions, which when executed by a processor 1111B, will implement the above-described method(s) for determining indirect coupling capacitances between signal nodes of an interconnect structure as described above. If these indirect coupling capacitances cause the transmission characteristics of the signal nodes to fall outside of a desired range, then the original IC design can be modified in order to change the indirect coupling capacitances. The above-described method(s) for determining indirect coupling capacitances between signal nodes of an interconnect structure can then be applied to the modified IC design, and the results can be used to determine whether the transmission characteristics of the signal nodes are acceptable. This process can be repeated until all of the indirect coupling capacitances allow for acceptable transmission of signals on the signal nodes.

Physical verification (step 1126): At this step various checking functions are performed to ensure correctness for: manufacturing, electrical issues, lithographic issues, and circuitry. Exemplary EDA software products from Synopsys, Inc. that can be used at this step include the Hercules™ product.

Resolution enhancement (step 1128): This step involves geometric manipulations of the layout to improve manufacturability of the design. Exemplary EDA software products from Synopsys, Inc. that can be used at this step include Proteus™, ProteusAF™, and PSMGen™ products.

Mask data preparation (step 1130): This step provides the "tape-out" data for production of masks for lithographic use to produce finished chips. Exemplary EDA software products from Synopsys, Inc. that can be used at this step include the CATS® family of products.

Although illustrative embodiments of the invention have been described in detail herein with reference to the accompanying figures, it is to be understood that the invention is not limited to those precise embodiments. Thus, the scope of the invention is defined by the following claims and their equivalents.

We claim:

1. A method for performing floating node reduction in an integrated circuit design, executing on a computer, comprising:
    (A) determining a capacitance matrix that specifies coupling capacitances between signal nodes and floating nodes of an interconnect structure of the integrated circuit design;
    (B) using the computer to perform a plurality of walks from one of the signal nodes to the other signal nodes, wherein each of the walks includes one or more of the floating nodes, and wherein each of the walks is directed based on probabilities derived from the coupling capacitances of the capacitance matrix;
    (C) for each of the other signal nodes, maintaining a count that specifies a number of the plurality of walks that end on the other signal node;
    (D) using the counts maintained for each of the other signal nodes to determine indirect coupling capacitances from the one of the signal nodes to each of the other signal nodes;
    (E) repeating steps (B), (C) and (D) for each of the signal nodes; and
    (F) using the computer to build a model of the signal nodes of the interconnect structure of the integrated circuit design, using the indirect coupling capacitances to model parasitic capacitances introduced to the signal nodes by the floating nodes whereby the model eliminates the floating nodes from the interconnect structure of the integrated circuit design.

2. The method of claim 1, wherein each of the walks includes a first hop that proceeds from the one of the signal nodes to one of the floating nodes.

3. The method of claim 2, wherein the probability of the first hop landing on a particular one of the floating nodes is defined as the coupling capacitance between the one of the signal nodes and the particular one of the floating nodes, divided by the sum of the coupling capacitances between the one of the signal nodes and each of the floating nodes.

4. The method of claim 1, wherein each of the walks includes a hop that proceeds from a particular one of the floating nodes to a second one of the signal nodes.

5. The method of claim 4, wherein the probability of the hop landing on the second one of the signal nodes is defined as the coupling capacitance between the particular one of the floating nodes and the second one of the signal nodes, divided by the sum of the coupling capacitances between the particular one of the floating nodes and each of the other floating nodes and each of the other signal nodes.

6. The method of claim 1, further comprising determining hopping probabilities from each of the signal nodes to each of the floating nodes, based on the coupling capacitances between the signal nodes and the floating nodes.

7. The method of claim 1, further comprising generating cumulative probability arrays based on the determined hopping probabilities, wherein the each of the cumulative probability arrays defines: (1) probabilities of hopping from one of the signal nodes to each of the floating nodes, or (2) probabilities of hopping from one of the floating nodes to one of the other floating nodes, or to one of the other signal nodes.

8. The method of claim 7, wherein performing the plurality of walks comprises:
generating a plurality of random numbers; and
using the random numbers to access the cumulative probability arrays, thereby directing the plurality of walks.

9. The method of claim 1, wherein the indirect coupling capacitance from the one of the signal nodes to a second one of the signal nodes is determined by multiplying a total indirect coupling capacitance of the one of the signal nodes by a ratio equal to a count of the number of walks from the one of the signal nodes that end on the second one of the signal nodes, divided by a total number of the walks.

10. The method of claim 1, further comprising:
determining a second capacitance matrix that specifies coupling capacitances between the signal nodes and the floating nodes at a process corner;
determining hopping probabilities between the signal nodes and the floating nodes based on the coupling capacitances of the second capacitance matrix;
determining modified weights of each of the plurality of walks based on the determined hopping probabilities; and
using the modified weights of each of the plurality of walks to determine indirect coupling capacitances from the one of the signal nodes to each of the other signal nodes at the process corner.

11. The method of claim 10, wherein each of the walks includes a plurality of hops, the method further comprising determining a modified weight of each of the hops of each walk based on the hopping probabilities.

12. The method of claim 11, wherein a modified weight of each of the hops is equal to a probability of the hop at the process corner divided by a probability of the hop during the associated walk.

13. The method of claim 12, wherein the modified weight of each walk is the product of the modified weight of each of the hops of the walk.

14. The method of claim 13, wherein the indirect coupling capacitance is equal to the modified weight divided by the number of walks times the indirect coupling capacitance of the one of the signal nodes at the process corner.

15. The method of claim 1, further comprising:
determining that the signal nodes of the integrated circuit design exhibit acceptable transmission characteristics based on the indirect coupling capacitances; and
continuing to include the signal nodes and the floating nodes in the interconnect structure of the integrated circuit design based on determining that the signal nodes of the integrated circuit design exhibit acceptable transmission characteristics.

16. The method of claim 1, further comprising:
determining that the signal nodes of the integrated circuit design do not exhibit acceptable transmission characteristics based on the indirect coupling capacitances; and
modifying the integrated circuit design to change the indirect coupling capacitances upon determining that the signal nodes of the integrated circuit design do not exhibit acceptable transmission characteristics.

17. A non-transitory computer readable medium that stores instructions, which, when executed, cause a computer to perform a method for performing floating node reduction in an integrated circuit design, comprising:
(A) determining a capacitance matrix that specifies coupling capacitances between signal nodes and floating nodes of an interconnect structure of an integrated circuit design;
(B) performing a plurality of walks from one of the signal nodes to the other signal nodes, wherein each of the walks includes one or more of the floating nodes, and wherein each of the walks is directed based on probabilities derived from the coupling capacitances of the capacitance matrix;
(C) for each of the other signal nodes, maintaining a count that specifies a number of the plurality of walks that end on the other signal node;
(D) using the counts maintained for each of the other signal nodes to determine indirect coupling capacitances from the one of the signal nodes to each of the other signal nodes;
(E) repeating steps (B), (C) and (D) for each of the signal nodes; and
(F) building a model of the signal nodes of the interconnect structure of the integrated circuit design, using the indirect coupling capacitances to model parasitic capacitances introduced to the signal nodes by the floating nodes, whereby the model eliminates the floating nodes from the interconnect structure of the integrated circuit design.

18. The computer readable medium of claim 17, wherein each of the walks includes a first hop that proceeds from the one of the signal nodes to one of the floating nodes.

19. The computer readable medium of claim 18, wherein the probability of the first hop landing on a particular one of the floating nodes is defined as the coupling capacitance between the one of the signal nodes and the particular one of the floating nodes, divided by the sum of the coupling capacitances between the one of the signal nodes and each of the floating nodes.

20. The computer readable medium of claim 17, wherein each of the walks includes a hop that proceeds from a particular one of the floating nodes to a second one of the signal nodes.

21. The computer readable medium of claim 20, wherein the probability of the hop landing on the second one of the signal nodes is defined as the coupling capacitance between the particular one of the floating nodes and the second one of the signal nodes, divided by the sum of the coupling capacitances between the particular one of the floating nodes and each of the other floating nodes and each of the other signal nodes.

22. The computer readable medium of claim 17, wherein the method performed further comprises determining hopping probabilities from each of the signal nodes to each of the floating nodes, based on the coupling capacitances between the signal nodes and the floating nodes.

23. The computer readable medium of claim 17, wherein the method performed further comprises generating cumulative probability arrays based on the determined hopping probabilities, wherein the each of the cumulative probability arrays defines: (1) probabilities of hopping from one of the signal nodes to each of the floating nodes, or (2) probabilities of hopping from one of the floating nodes to one of the other floating nodes, or to one of the other signal nodes.

24. The computer readable medium of claim 23, wherein performing the plurality of walks comprises:
generating a plurality of random numbers; and
using the random numbers to access the cumulative probability arrays, thereby directing the plurality of walks.

25. The computer readable medium of claim 17, wherein the indirect coupling capacitance from the one of the signal nodes to a second one of the signal nodes is determined by multiplying a total indirect coupling capacitance of the one of the signal nodes by a ratio equal to a count of the number of walks from the one of the signal nodes that end on the second one of the signal nodes, divided by a total number of the walks.

26. The computer readable medium of claim 17, wherein the method performed further comprises:
determining a second capacitance matrix that specifies coupling capacitances between the signal nodes and the floating nodes at a process corner;
determining hopping probabilities between the signal nodes and the floating nodes based on the coupling capacitances of the second capacitance matrix;
determining modified weights of each of the plurality of walks based on the determined hopping probabilities; and
using the modified weights of each of the plurality of walks to determine indirect coupling capacitances from the one of the signal nodes to each of the other signal nodes at the process corner.

27. The computer readable medium of claim 26, wherein each of the walks includes a plurality of hops, the method further comprising determining a modified weight of each of the hops of each walk based on the hopping probabilities.

28. The computer readable medium of claim 27, wherein a modified weight of each of the hops is equal to a probability of the hop at the process corner divided by a probability of the hop during the associated walk.

29. The computer readable medium of claim 28, wherein the modified weight of each walk is the product of the modified weight of each of the hops of the walk.

30. The computer readable medium of claim 29, wherein the indirect coupling capacitance is equal to the modified weight divided by the number of walks times the indirect coupling capacitance of the one of the signal nodes at the process corner.

31. The computer readable medium of claim 17, wherein the method performed further comprises:
determining that the signal nodes of the integrated circuit design exhibit acceptable transmission characteristics based on the indirect coupling capacitances; and
continuing to include the signal nodes and the floating nodes in the interconnect structure of the integrated circuit design based on determining that the signal nodes of the integrated circuit design exhibit acceptable transmission characteristics.

32. The computer readable medium of claim 17, wherein the method performed further comprises:
determining that the signal nodes of the integrated circuit design do not exhibit acceptable transmission characteristics based on the indirect coupling capacitances; and
modifying the integrated circuit design to change the indirect coupling capacitances upon determining that the signal nodes of the integrated circuit design do not exhibit acceptable transmission characteristics.

* * * * *